United States Patent
Cramer et al.

(12) 
(10) Patent No.: US 6,366,654 B1
(45) Date of Patent: Apr. 2, 2002

(54) METHOD AND SYSTEM FOR CONDUCTING A MULTIMEDIA PHONE CELL

(75) Inventors: Seth Whitney Cramer; Bertrand Marc-Andre Michaud; Charles Gerald Rohs; Daniel John Paslawski; Qi Li; Kevin Chi Hin Lo, all of Calgary (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/110,138

(22) Filed: Jul. 6, 1998

(51) Int. Cl.[7] ............................................. H04M 11/00
(52) U.S. Cl. ................ 379/93.09; 379/93.23; 379/90.01; 709/22.3
(58) Field of Search ............................ 379/90.01, 93.01, 379/93.08–93.18, 93.21–93.26, 93.28; 709/223, 225, 229, 247

(56) References Cited

U.S. PATENT DOCUMENTS

| | | | | |
|---|---|---|---|---|
| 4,431,867 A | * | 2/1984 | Heatherington | 379/93.28 |
| 5,450,123 A | * | 9/1995 | Smith | 379/93.12 |
| 5,521,964 A | | 5/1996 | Shull et al. | 379/67 |
| 5,764,736 A | * | 6/1998 | Shacher | 379/93.09 |
| 5,764,910 A | * | 6/1998 | Shacher | 709/223 |

* cited by examiner

Primary Examiner—Wing F. Chan
(74) Attorney, Agent, or Firm—Cobrin & Gittes

(57) ABSTRACT

A method and apparatus for conducting a multimedia telephone call. The apparatus carries out the method by establishing a telephone call between first and second customer premises equipment and generating, at the first customer premises equipment, a frequency shift keyed message containing a network resource locator. The FSK message is then transmitted from the first customer premises equipment to the second customer premises equipment during the telephone call and is received at the second customer premises equipment.

27 Claims, 12 Drawing Sheets

F/S = FLASH FILE
JVM = JAVA VIRTUAL MACHINE
RTX = REAL TIME XSERVER

METHOD AND SYSTEM FOR CONDUCTING A MULTIMEDIA PHONE CELL

FIELD OF THE INVENTION

This invention relates to a method and system for conducting a multimedia telephone call, and more particularly to a system which facilitates a voice telephone call while navigating to a network resource specified by a far end telephone.

BACKGROUND OF THE INVENTION

With the advent of the world-wide web, various websites are available as network resources from which a user may download and view advertising and information relating to goods and services offered by a company. In order to do this, the user must first be provided with the identity of the website to which the user should navigate.

Once the user has navigated to a particular website, the user's interaction with the website is, essentially, one of machine interaction in the sense that the user makes choices as to which displays or portions of the display he/she wishes to navigate to. Often, websites will provide instructions as to how to navigate about the website. Such navigation may include indexes to other pages available at the website.

Unfortunately, however, users are not always aware of available websites providing information of interest, nor are they aware of all of the various content that may be provided in some of the more complex websites. Often to navigate about such content, a user must investigate all links which appear to be of interest. Often, however, identifications of links do not always convey the content of the resource associated with the link and, therefore, the user may be directed to links which are really not of interest. In any event, the choice of links to navigate to, depend upon the user's interpretation of the names of the links.

What would be desirable, therefore, is a way of identifying to a user links which may be important to the user's particular needs, based on an interpretation of the user's needs provided by the provider. In addition, the ability to converse with a remote party observing the same image of goods or services or content, at the same time, would be desirable. The present invention addresses this need.

SUMMARY OF THE INVENTION

In accordance with one aspect of the invention, there is provided a method of conducting a multimedia telephone call, the method including the steps of:

a) establishing a telephone call between first and second customer premises equipment;

b) generating at the first customer premises equipment a frequency shift keyed message containing a network resource locator;

c) transmitting the FSK message from the first customer premises equipment to the second customer premises equipment during the telephone call; and d) receiving the FSK message at the second customer premises equipment.

Preferably, the method involves the steps of extracting the network resource locator from the FSK message, establishing a connection to a network resource indicated by the network resource locator. Desirably, the connection is established using a second telephone line.

Preferably, the connection to the network resource is established while maintaining the telephone call active.

The method further includes the step of downloading a file from the network resource identified by the network resource locator and producing a display image at the second customer premises equipment, from the file, while displaying an associated image at the first customer premises equipment.

More particularly, the method preferably includes the step of producing a display image at the second customer premises equipment while displaying an associated image at the first customer premises equipment, while maintaining the telephone call to enable a user of the second customer premises equipment to view images designated by a user of the first customer premises equipment, while conducting a telephone conversation with the user of the first customer premises equipment.

It is desirable that there is maintained a list of network resource locators at the first customer premises equipment and that the network resource locators are used in respective FSK messages.

Desirably, the method includes the step of associating image files with respective network resource locators and producing display images corresponding to respective network resource locators when an FSK message is generated.

In accordance with another aspect of the invention, there is provided a system for conducting a multimedia telephone call. The system includes first and second customer premises equipment and provisions which are disposed at least one of the first and second customer premises equipment for establishing a telephone call on a first telephone line, between the first and second customer premises equipment. The system further includes provisions for generating at the first customer premises equipment a frequency shift keyed message containing a network resource locator and provisions for transmitting the FSK message from the first customer premises equipment to the second customer premises equipment during the telephone call. Provisions are provided at the second customer premises equipment, for receiving the FSK message.

Preferably, the apparatus includes provisions for extracting the network resource locator from the FSK message.

Desirably, the apparatus includes provisions for establishing a connection to a network resource indicated by the network resource locator.

Preferably, the apparatus includes provisions for establishing the connection to the network resource on a second telephone line.

Desirably, the apparatus includes provisions for establishing the connection to the network resource while maintaining the telephone call active on the first telephone line.

Preferably, the apparatus includes provisions for downloading a file from the network resource identified by the network resource locator.

Desirably, the apparatus includes provisions for producing a display image at the second customer premises equipment, from the file, while displaying an associated image at the first customer premises equipment.

Preferably, the apparatus includes provisions for producing a display image at the second customer premises equipment while displaying an associated image at the first customer premises equipment, while maintaining the telephone call on the first telephone line to enable a user of the second customer premises equipment to view images designated by a user of the first customer premises equipment, while conducting a telephone conversation with the user of the first customer premises equipment.

Desirably, the apparatus includes provisions for maintaining a list of network resource locators at the first customer premises equipment and selectively using the network resource locators in respective FSK messages.

Preferably, the apparatus includes provisions for associating image files with respective network resource locators and producing display images at the first customer premises equipment, the display images corresponding to respective network resource locators when an FSK message is generated.

In accordance with another aspect of the invention, there is provided a system for conducting a multimedia telephone call, the system including first and second customer premises equipment operable to establish a telephone call between each other on a first telephone line, a processor at the first customer premises equipment, for generating at the first customer premises equipment a frequency shift keyed message containing a network resource locator, a transmitter for transmitting the FSK message from the first customer premises equipment to the second customer premises equipment during the telephone call and a receiver at the second customer premises equipment for receiving the FSK message.

Desirably, the apparatus includes a processor at the second customer premises equipment for extracting the network resource locator from the FSK message.

Preferably, the apparatus includes a processor and a browser at the second customer premises equipment for establishing a connection to a network resource indicated by the network resource locator.

Desirably, the apparatus includes a modem for establishing the connection to the network resource on a second telephone line.

Preferably, the processor at the second customer premises equipment is operable to establish the connection to the network resource while maintaining the telephone call active on the first telephone line.

Desirably, the processor and the browser at the second customer premises equipment is operable to download a file from the network resource identified by the network resource locator.

Preferably, the apparatus includes first and second displays respective at the first and second customer premises equipment and desirably, the processor at the second customer premises equipment is operable to cooperate with the second display to produce a display image at the second customer premises equipment, from the file, while the processor at the first customer premises equipment cooperates with the first display to display an associated image at the first customer premises equipment.

Preferably, the apparatus includes a first processor and memory at the first customer premises equipment for maintaining a list of network resource locators at the first customer premises equipment, the processor being programmed to selectively include the network resource locators in respective FSK messages.

Desirably, the first processor is programmed to associate image files with respective network resource locators and produce display images at the first customer premises equipment, the display images corresponding to respective network resource locators included in the FSK messages, as the FSK messages are generated.

In accordance with another aspect of the invention, there is provided a method for dynamically dispatching network resource locators. The method includes the steps of:

a) establishing a telephone call between first and second customer premises equipment;

b) generating at the first customer premises equipment a frequency shift keyed message containing the network resource locator; and c) transmitting the FSK message from the first customer premises equipment to the second customer premises equipment during the telephone call.

Preferably, the method includes the steps of maintaining a list of network resource locators at the first customer premises equipment and selectively using the network resource locators in respective FSK messages.

Desirably, the method includes the steps of associating image files with respective network resource locators and producing display images corresponding to respective network resource locators when an FSK message is generated.

In accordance with another aspect of the invention, there is provided a system for dynamically dispatching network resource locators. The system includes first and second customer premises equipment and provisions which are disposed at at least one of the first and second customer premises equipment for establishing a telephone call on a first telephone line, between the first and second customer premises equipment, provisions for generating at the first customer premises equipment a frequency shift keyed message containing the network resource locator, and provisions for transmitting the FSK message from the first customer premises equipment to the second customer premises equipment during the telephone call.

Preferably, the apparatus includes provisions for maintaining a list of network resource locators at the first customer premises equipment and selectively using the network resource locators in respective FSK messages.

Desirably, the apparatus includes provisions for associating image files with respective network resource locators and for producing display images at the first customer premises equipment, the display images corresponding to respective network resource locators when an FSK message is generated.

In accordance with another aspect of the invention, there is provided a system for dynamically dispatching network resource locators. The system includes first and second customer premises equipment operable to establish a telephone call between each other on a first telephone line, a processor at the first customer premises equipment, for generating at the first customer premises equipment a frequency shift keyed message containing the network resource locator and a transmitter for transmitting the FSK message from the first customer premises equipment to the second customer premises equipment during the telephone call.

Preferably, the apparatus includes a first processor and memory at the first customer premises equipment for maintaining a list of network resource locators at the first customer premises equipment, the processor being programmed to selectively include the network resource locators in respective FSK messages.

Desirably, the first processor is programmed to associate image files with respective network resource locators and produce display images at the first customer premises equipment, the display images corresponding to respective network resource locators included in the FSK messages, as the FSK messages are generated.

BRIEF DESCRIPTION OF THE DRAWINGS

In drawings which illustrate embodiments of the invention.

DETAILED DESCRIPTION

FIG. 1

Figure 1:
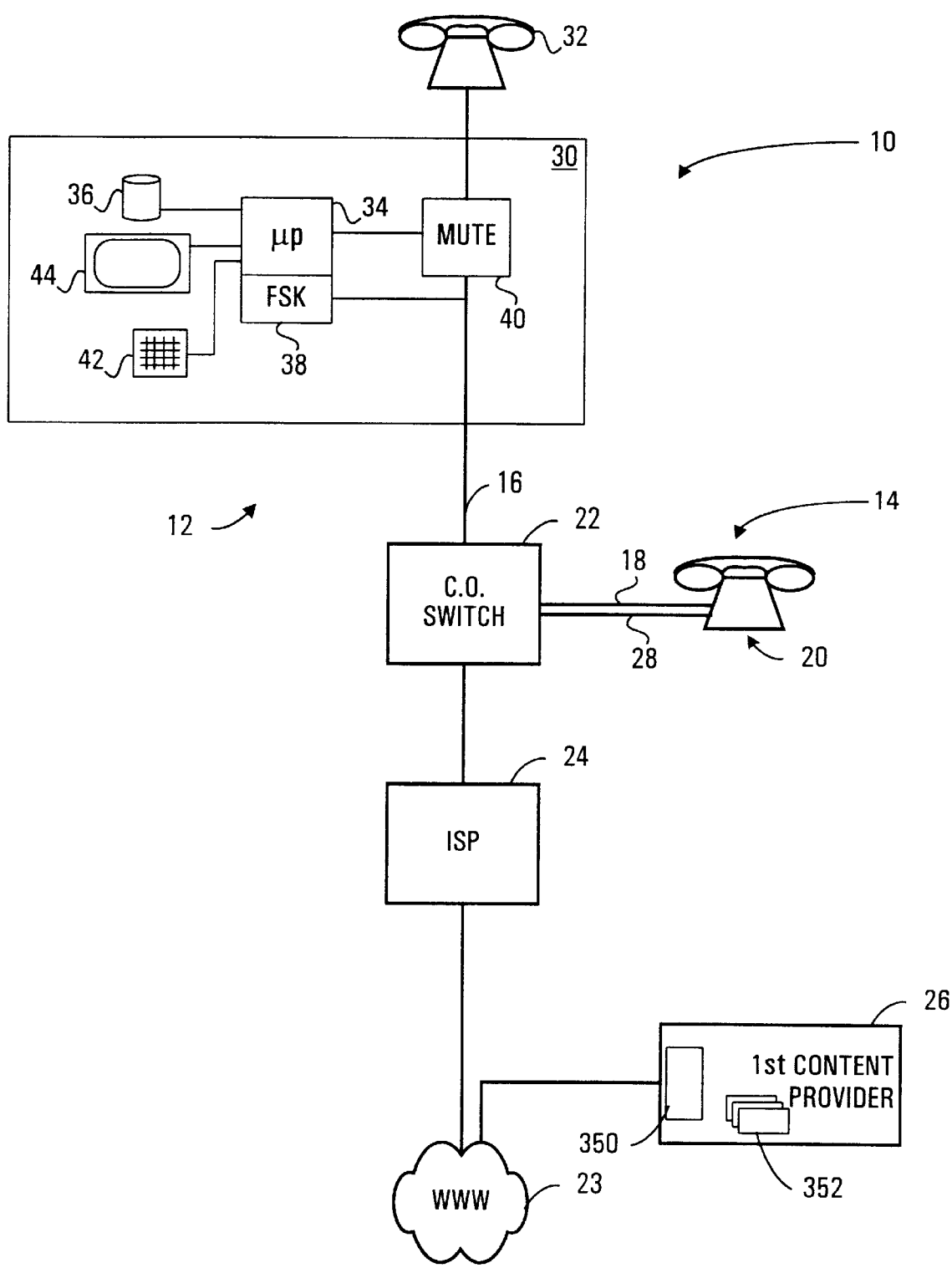
FIG. 1 is a schematic diagram of a system, according to a first embodiment of the invention.

Referring to FIG. 1, a system for conducting a multimedia phone call is shown generally at 10. The apparatus includes a first customer premises equipment shown generally at 12 and second customer premises equipment shown generally at 20. In this embodiment, the first customer premises equipment 12 is connected to a central office switch 22 by a first telephone line 16. Similarly, the second customer premises equipment 20 is connected to the central office switch 22 by second and third telephone lines 18 and 28. Also connected to the central office switch 22 is an internet services provider 24 for providing communication facilities with the World Wide Web shown generally at 23. The world wide web 23 includes a first content provider 26 having a web server 350 and a database of hypertext markup language (HTML) content files 352 which may be served to the World Wide Web through the web server 350.

Still referring to FIG. 1, in this embodiment the customer premises equipment 12 includes a personal computer 30 and a conventional telephone 32. The personal computer 30 includes a microprocessor 34, memory 36, a frequency shift keyed data transmitter 38, a mute circuit 40, a keyboard 42 and a display 44, all in communication with the microprocessor 34. The conventional telephone 32 acts as means at the first customer premises equipment for establishing a telephone call on a first telephone line, between the first and second customer premises equipment.

The frequency shift keyed data transmitter 38 and mute circuit 40 are connected to the telephone line 16 from the central office switch 22 and the mute circuit 40 is connected in series with the telephone 32 and the telephone line 16 to selectively mute signals appearing on the telephone line, from the telephone 32. The microprocessor 34 controls the mute circuit 40 and the FSK transmitter 38 such that when FSK data is being transmitted by the FSK transmitter 38, the mute circuit 40 is rendered operational to mute FSK signals from the telephone 32.

Figure 2:
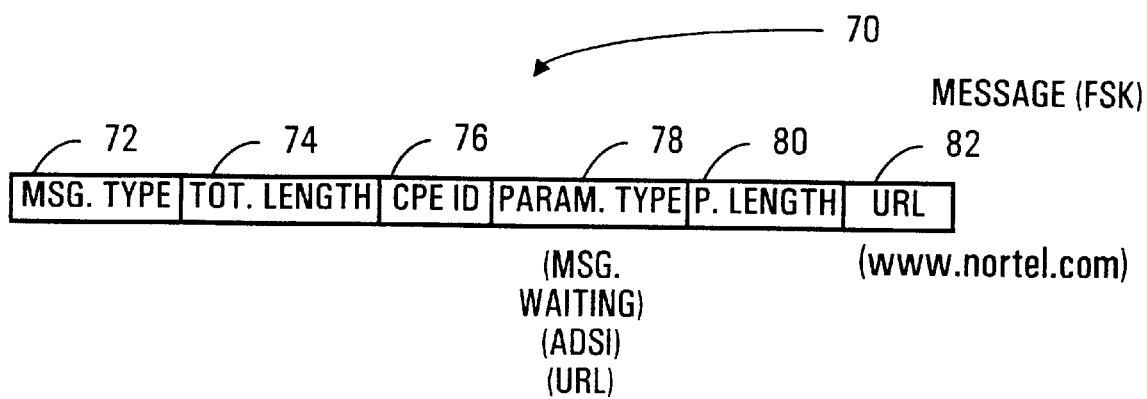
FIG. 2 is a schematic representation of an FSK message transmitted from a first customer premises equipment to a second customer premises equipment shown in FIG. 1.

In this embodiment, the memory 36 is loaded with a list of uniform resource locators identifying respective pages at the first content provider 26, and image files associated with respective uniform resource locators. The microprocessor is programmed to receive input from the keyboard 42 identifying a desired URL and to generate an FSK message having a format as shown in FIG. 2 and to display an image file associated with a URL in a respectively transmitted FSK message. Thus the microprocessor acts as means for associating image files with respective network resource locators and producing display images at the first customer premises equipment, the display images corresponding to respective network resource locators when an FSK message is generated.

In general, the personal computer at the first customer premises equipment acts as a system for dynamically dispatching network resource locators.

FIG. 2

Referring to FIG. 2 the FSK message includes a message type field 72, a total length field 74, a cpe id field 76, a parameter type field 78, a parameter length field 80 and a parameter data field 82. The message type field identifies the message as an FSK message containing a URL identifying a network resource from which a page can be downloaded. Predefined codes are used to identify predefined message types. The total length field 74 is used to hold a value representing the total length of the FSK message. The CPE ID field 76 is loaded with a value representing a CPE ID, which in this embodiment is zero. The parameter type field 78 is used to identify the type of data stored in the parameter data field 82 and, in this embodiment, the parameter type field stores a predefined code representing that the contents of the parameter data field 82 hold a URL. The parameter length field 80 is used to identify the length of the parameter data field 82. The parameter data field 82 is, in this embodiment, used to hold a uniform resource locator identified by input received at the keyboard 42 and copied from the memory 36.

FIG. 3

Figure 3:
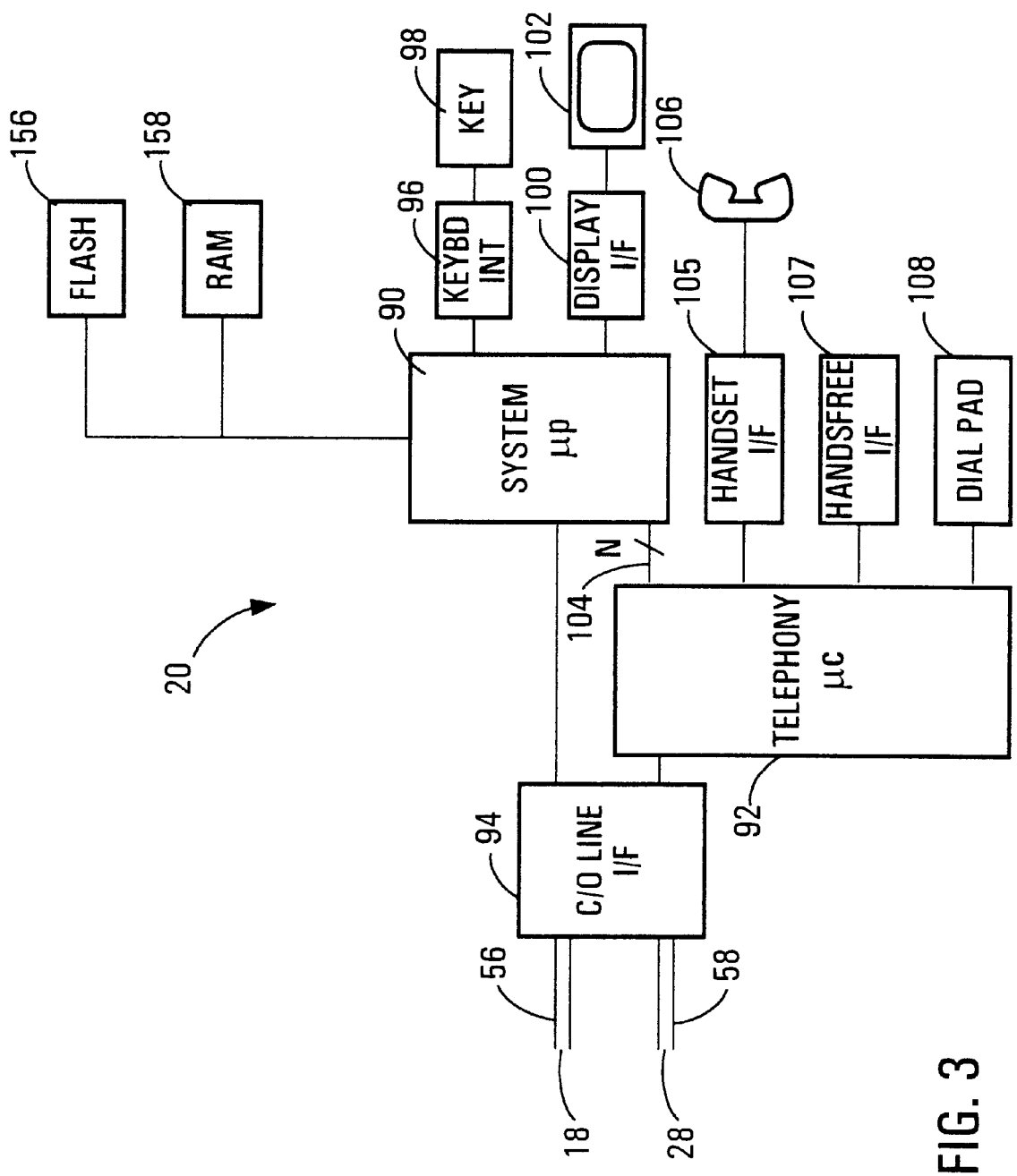
FIG. 3 is a schematic representation of a telephone according to the first embodiment of the invention.

Referring to FIG. 3, the telephone is shown generally at 20 and includes a system microprocessor 90, a telephony microcontroller 92, and a central office line interface 94 in communication with both the system microprocessor 90 and the telephony microcontroller 92. The system microprocessor is connected to a keyboard interface 96 and a keyboard 98, for receiving user input for commanding the system microprocessor 90 to effect certain functionality. The system microprocessor is further connected to a display interface 100 which is further connected to a display 102, for displaying output to a user.

The telephony microcontroller 92 is in communication with the system microprocessor 90 by a plurality of signal lines 104 and is further in communication with a handset interface 105 for controlling signals to and from a conventional handset 106 and a hands-free interface 107 for providing conventional speakerphone functionality to the telephone.

The telephony microcontroller 92 is further in communication with a dial pad 108 of the conventional type, for enabling a user to dial telephone numbers at the telephone.

FIG. 4

Figure 4:
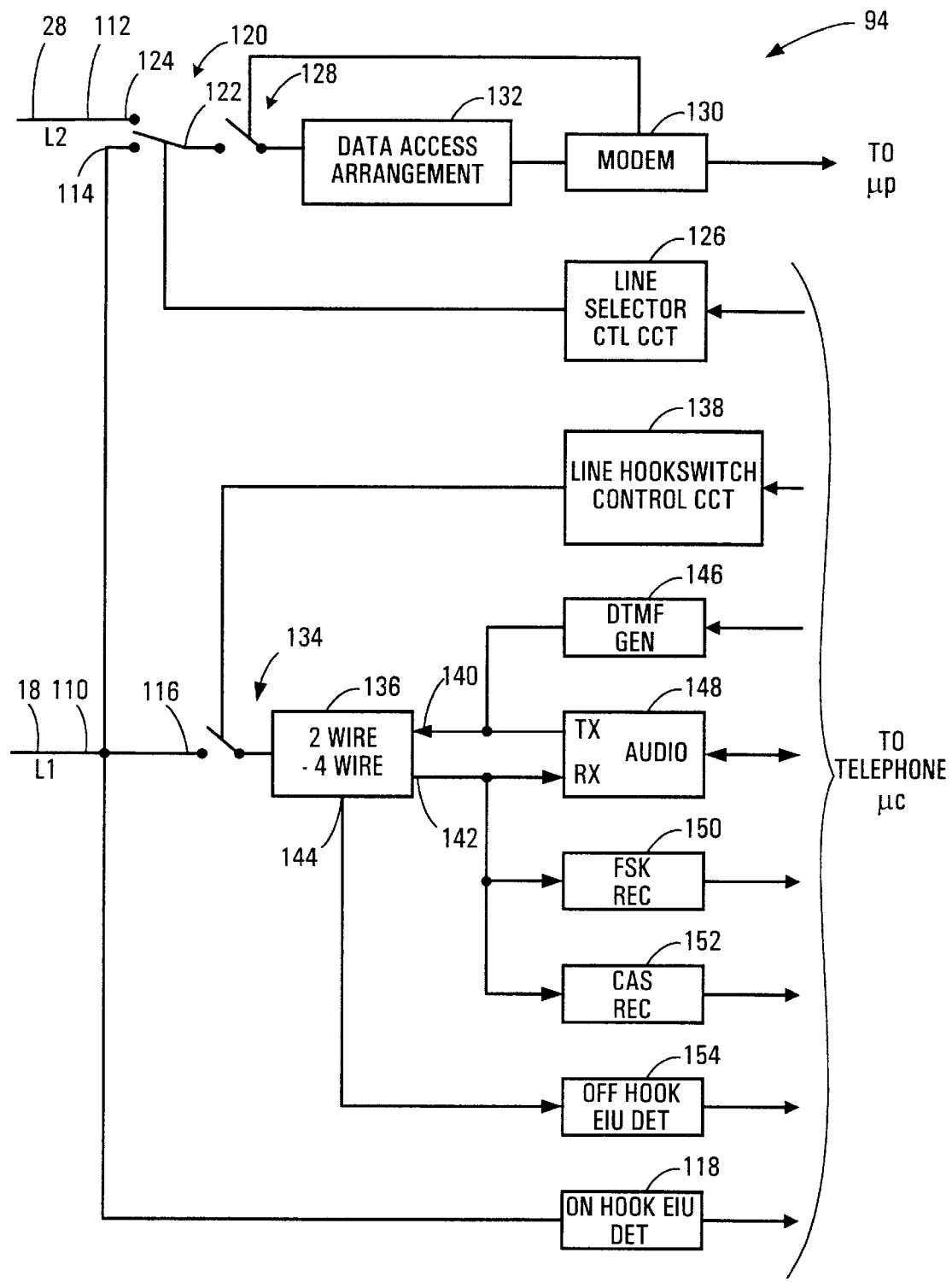
FIG. 4 is a block diagram of a central office line interface in the second telephone shown in FIG. 3.

Referring to FIG. 4, the central office line interface is shown in greater detail at 94. The central office line interface has first and second telephone line inputs 110 and 112 which are connected to the second and third telephone lines 18 and 28 respectively, from the central office switch 22 shown in FIG. 1.

The first line input 110 is connected to a line 1 modem terminal 114, a two to four wire interface terminal 116 and an on-hook extension in use detector 118. The modem terminal 114 is connected to a line selector switch shown generally at 120 having a selector terminal 122 and a line 2 modem terminal 124. The line selector switch 120 is controlled by a line selector control circuit 126 to connect the selector terminal 122 to either. the line 2 modem terminal 124 or the line 1 modem terminal 114. The selector terminal 122 is further connected to a modem hook switch 128 which is controlled by a modem 130 in communication with the system microprocessor 90, shown in FIG. 3.

Referring back to FIG. 4, the modem hook switch 128 is connected to a data access arrangement 132 which isolates the modem from the telephone line and provides a DC path for seizing the line. The data access arrangement 132 is in communication with the modem 130, to provide analog signals to and from the modem 130, for communication to the system microprocessor.

The central office line interface further includes a line hook switch 134 and a two wire to four wire hybrid circuit 136. The hook switch 134 is controlled by a line hook switch control circuit 138 which opens and closes the hook switch 134 thereby connecting and disconnecting the second telephone line 18 to and from the two to four wire hybrid circuit 136.

The two to four wire hybrid circuit 136 has a transmit input 140 and a receive output 142 and an off-hook detect signal output 144. The transmit input 140 is connected to a DTMF generator 146 and a transmit output of an audio circuit 148. The DTMF generator is operable to provide tones to the transmit input 140 to provide DTMF tones on the third telephone line 18.

The receive output 142 of the two to four wire hybrid circuit 136 is connected to a receive input of the audio circuit 148, and is further connected to an FSK receiver 150 and a caller alerting signal receiver 152.

The off-hook EIU detect output 144 of the two to four wire hybrid circuit 136 is connected to an off-hook EIU detect circuit 154 which provides a signal indicating whether or not an extension is in use on the second telephone line 18, at the same time that the hook switch 134 is closed.

The on-hook extension in use detector 118 monitors the second telephone line 18 to provide a signal indicating whether or not an extension is in use on the first telephone line, when the hook switch 134 is in the open position.

The line selector control circuit 126, the line hook switch circuit 138 and the DTMF generator 146 are operable to receive signals from the telephony microcontroller 92 shown in FIG. 3, to control the state of the line selector switch 120, to control the state of the line hook switch 134 and to provide DTMF signals to the two to four wire interface for transmission on the second telephone line 18, respectively. The audio circuit 148 is in bi-directional communication with the telephony microcontroller which effectively provides an audio path, with audio signal processing to the handset interface 105 or hands-free interface 107 shown in FIG. 3.

The FSK receiver 150, caller alerting signal receiver 152, off-hook EIU detect circuit 154 and on-hook extension in use detector 118 provide FSK, CAS, off-hook EIU and on-hook EIU signals respectively to the telephony microcontroller.

Referring back to FIG. 3, the system microprocessor 90 is further in communication with FLASH memory 156 and random access memory (RAM) 158.

FIG. 5

Figure 5:
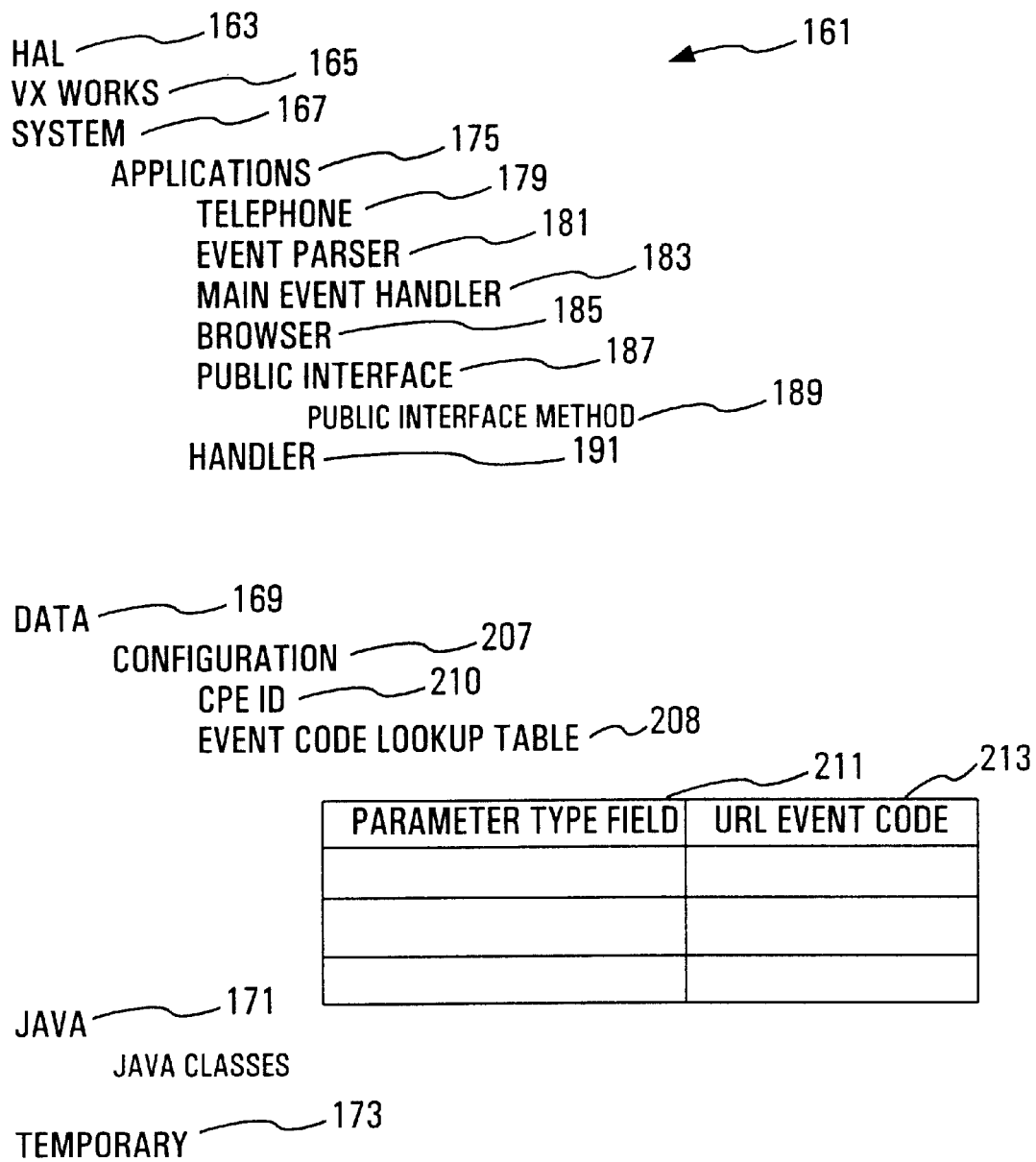
FIG. 5 is a tree diagram of a directory structure of file directories within the second telephone.

Referring to FIG. 5, the FLASH memory holds a directory structure as shown generally at 161. The directory structure includes a base directory having a hardware abstraction layer file 163, an operating system file 165, a system subdirectory 167, a data directory 169, a Java subdirectory 171 and a temporary subdirectory 173.

The hardware abstraction layer file 163 includes basic boot commands for booting up the system processor and for directing it to load the operating system file 165 into RAM, where it is run by the processor.

The operating system file 165 contains operating system commands for establishing basic operation of the system microprocessor 90. The operating system commands include a Board Support Package (BSP) and drivers which direct the processor to interact with the central office line interface 94, the telephony microcontroller 92, the keyboard interface 96 and the display interface 100 shown in FIG. 3. In this embodiment, the operating system is known as VXWorks (tm) provided by Windriver of Alameda, Calif. The operating system maintains a routing table 155 in the RAM 158 shown in FIG. 3 for maintaining details of connections established through the central office line interface 94 on the third subscriber line 28 shown in FIG. 4.

The operating system file further includes code implementing a Java (tm) virtual machine and a graphics layer known as RTX X-Windows server (tm) by Visicom of San Diego, Calif. The Java virtual machine includes core Java packages including Java.lang, Java.io, Java.applet, Java.net and Java.awt which in connection with the operating system files create a Java run time environment at the system microprocessor 90 shown in FIG. 3.

Still referring to FIG. 5, the system subdirectory 167 includes an applications subdirectory 175. The applications subdirectory 175 includes a telephone subdirectory 179 containing files for directing the system microprocessor 90 to cooperate with the telephony microcontroller 92 to provide telephony functionality. The applications subdirectory further includes an event parser subdirectory 181 containing event parser files, a main event handler subdirectory 183 containing main event handler files, a browser subdirectory 185 containing browser files, a public interface subdirectory 187 containing public interface method files 189 and a handler subdirectory 191 containing handler files.

The data subdirectory 169 includes a configuration data subdirectory 207 containing configuration files including a CPE ID file 210 and an event code lookup table file 208. The CPE ID file 210 holds a CPE ID of the telephone, to identify the telephone from other telephones which may be connected to the same telephone line. The event code lookup table file 208 contains an event code lookup table having parameter type and URL event code fields 211 and 213 respectively, for associating parameter types with URL event codes.

The Java subdirectory 171 includes Java class files of the type classes.jar.

The temporary subdirectory 173 is used to store applets, HTML pages and files which may be downloaded over one of the analog subscriber lines 18 and 28 shown in FIG. 3.

FIG. 6

Figure 6:
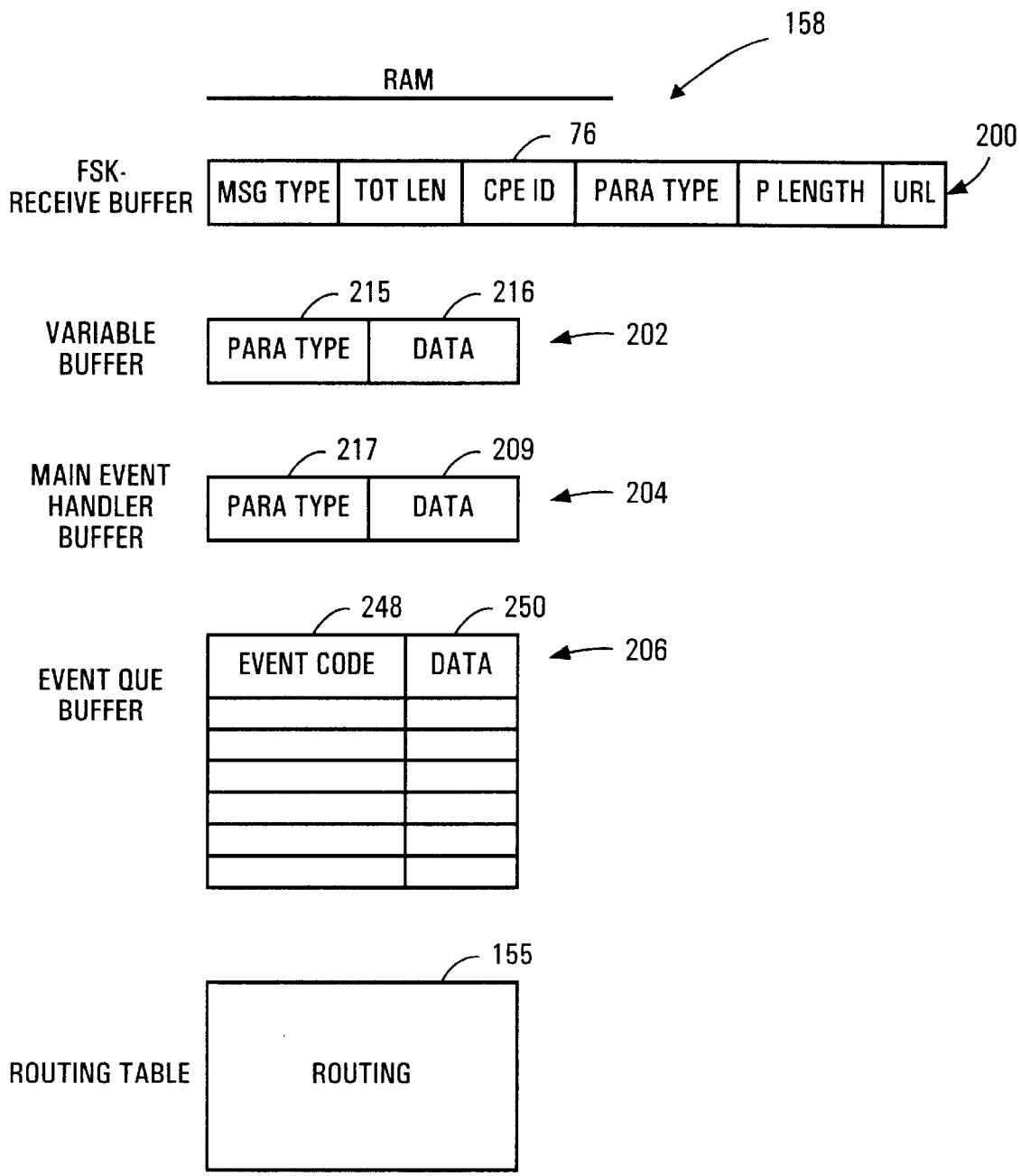
FIG. 6 is a schematic representation of storage areas in the RAM shown in FIG. 3.

Referring to FIG. 6, the RAM 158 is used to maintain an FSK receive buffer 200, a variable buffer 202, a main event handler buffer 204, an event queue buffer 206 and a routing table 155.

The FSK receive buffer 200 is of sufficient length to receive FSK messages, in general. In this embodiment, such messages are of the form shown in FIG. 2.

Referring back to FIG. 6, the variable buffer 202 and the main event handler buffer 204 hold variable and main event records respectively. The variable records include a parameter type field 215 and a data field 216 and the main event records include a parameter type field 217 and a data field 209. The event queue buffer 206 is a variable length buffer for storing various event queue records, each of which includes an event code field 248 and a data field 250.

FIG. 7

Figure 7:
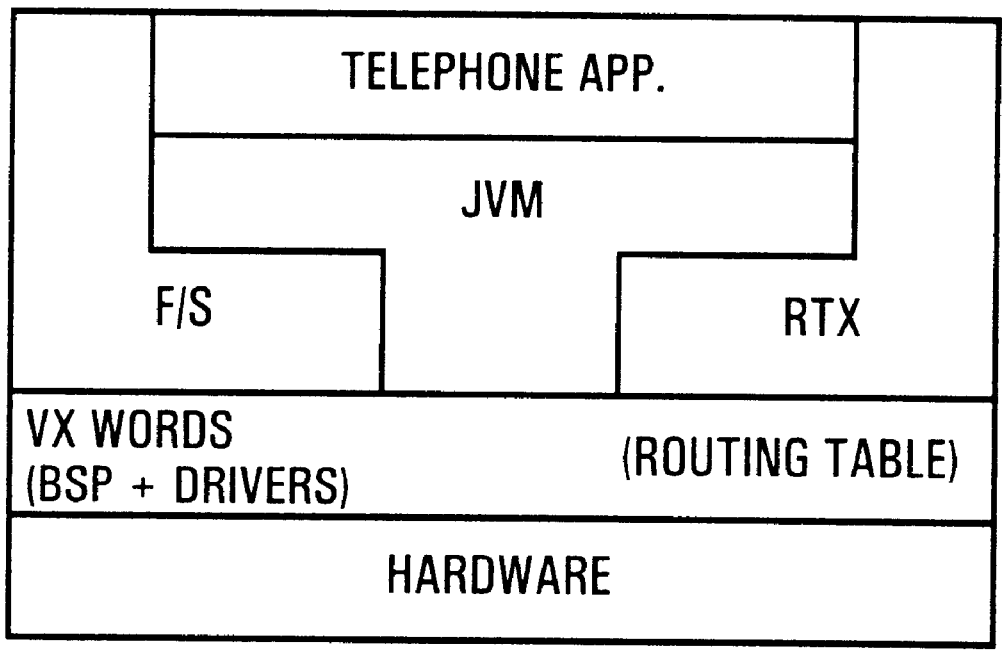
FIG. 7 is a schematic representation of a program architecture in a processor in the first telephone shown in FIG. 3.

Referring briefly to FIG. 3, the system microprocessor 90, FLASH memory 156, and RAM 158 together form a computer architecture. Referring to FIG. 7, this architecture is shown generally at 162.

FIG. 8

Figure 8:
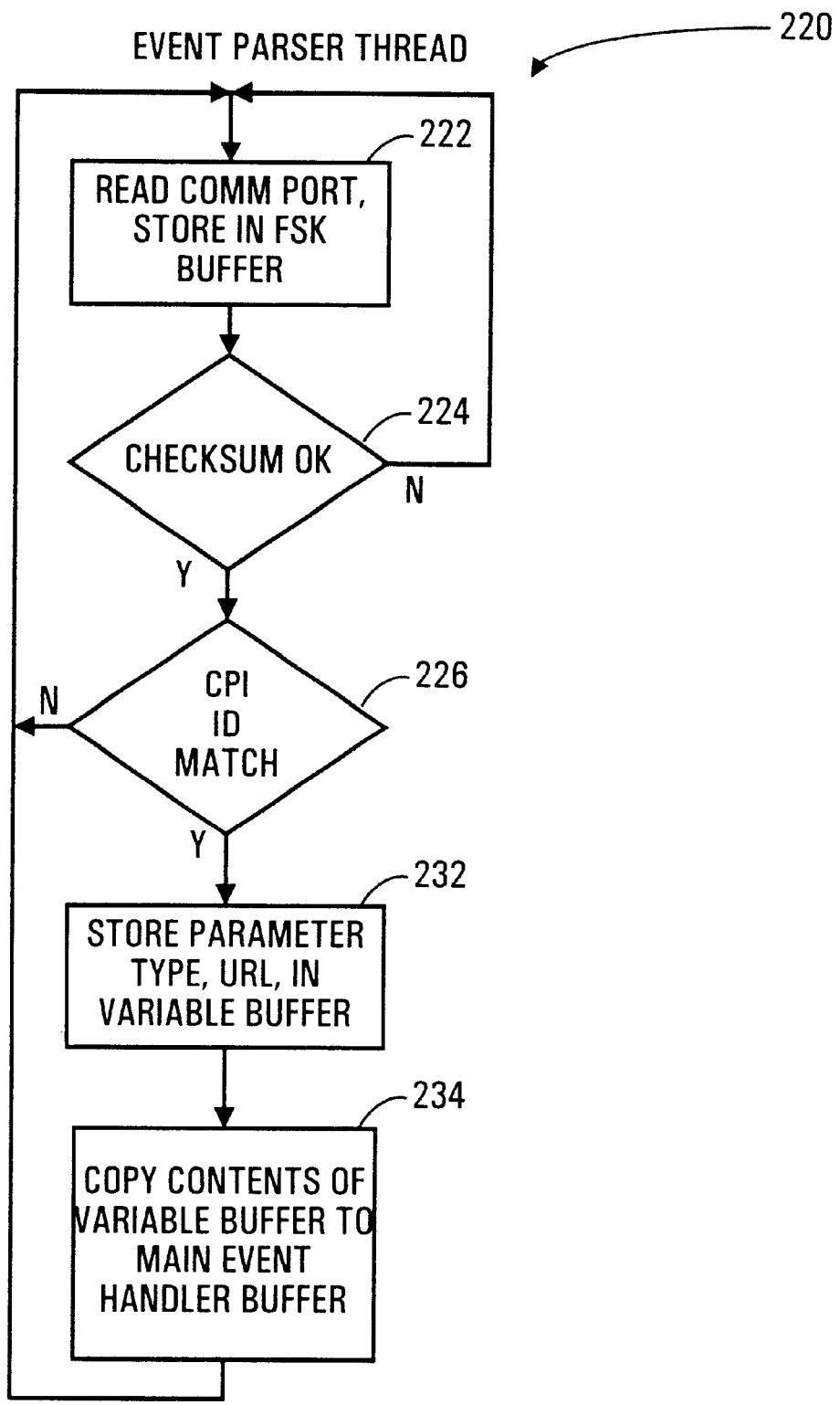
FIG. 8 is a flowchart of an event parser thread run by a system processor of the first telephone shown in FIG. 3.

Referring to FIG. 8, the event parser files in the event parser directory establish an event parser thread running on the system processor, as shown generally at 220. The event parser thread includes a read comm port instance 222 which directs the system microprocessor 90 shown in FIG. 3, to communicate with the telephony microcontroller to read the FSK receiver 150 to determine whether or not an FSK message is being received at the FSK receiver 150. If a message is not being received, the event parser thread is blocked on the read comm port instance 222. If the FSK receiver 150 is receiving an FSK message, such message is passed to the system microprocessor and stored in the FSK receive buffer 200.

The event parser thread then includes a checksum instance 224 which directs the processor to read the contents of the FSK receive buffer 200 to determine whether or not the message was received properly. If the message was not received properly, it is ignored and the processor is directed back to the read comm port instance 222.

If the message was received properly, the processor is directed to a CPE ID match instance 226 in which the contents of the CPE ID register 210 stored in the FLASH memory 156 is compared against the contents of the CPE ID field of the FSK message stored in the FSK receive buffer 200. If the CPE IDs do not match, the processor is returned to the read comm port instance 222.

If the CPE IDs match, the processor is directed to a store parameter type instance 232 which directs the processor to store the contents of the parameter type field and the contents of the data field in the variable buffer 202. The system microprocessor 90 is then directed to a copy instance 234 which directs it to copy the contents of the variable buffer 202 to the main event handler buffer 204. The processor is then returned back to the read comm port instance 222 where it blocks until a further FSK message is received.

FIG. 9

Main Event Handler Thread

Figure 9:
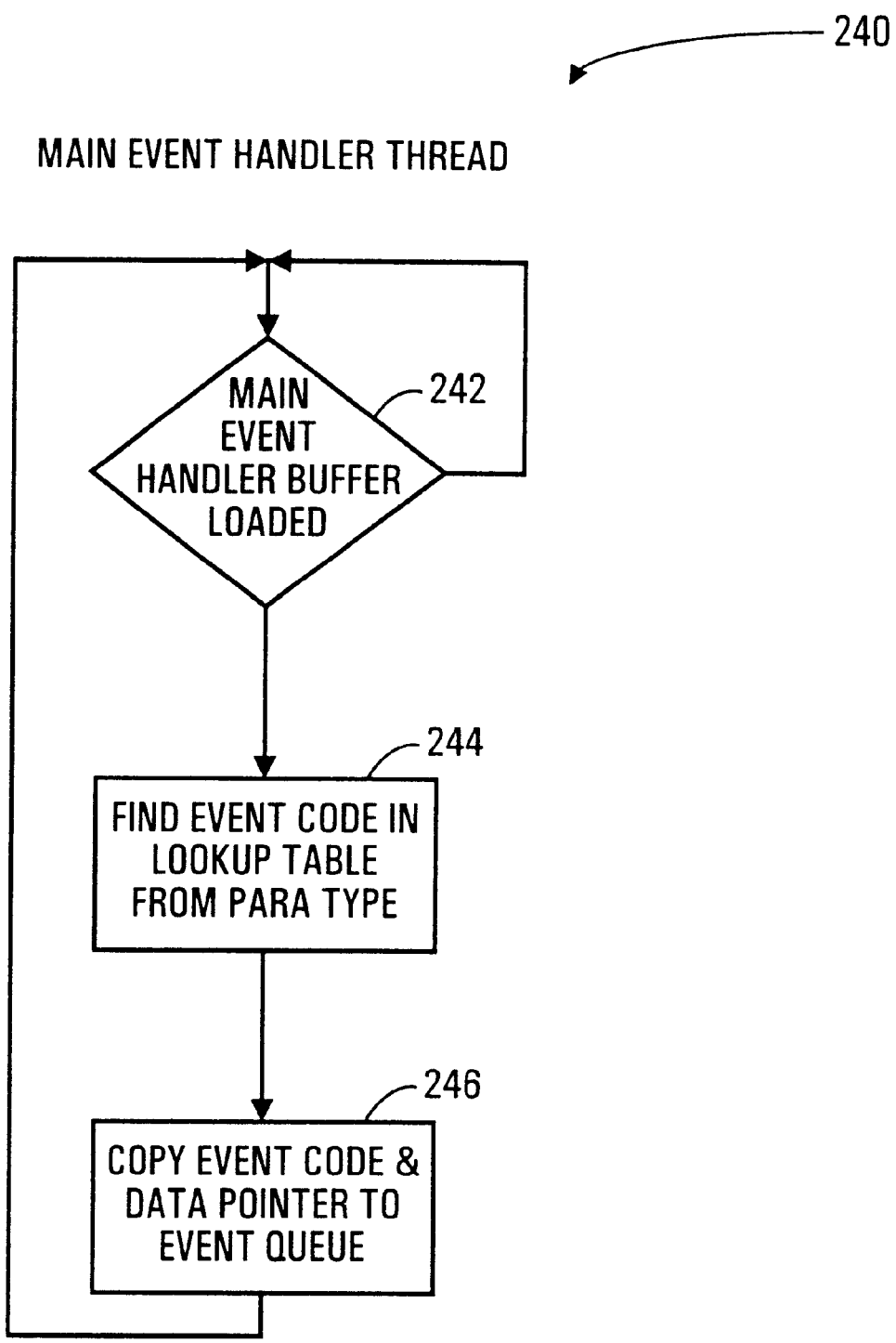
FIG. 9 is a flowchart of a main event handler thread run by the system processor.

Referring to FIG. 9, the main event handler files in the main event handler subdirectory 183 establish a main event handler thread as shown generally at 240. The main event handler thread includes a buffer loaded instance 242 which directs the system microprocessor 90 to determine whether or not the main event handler buffer 204 shown in FIG. 6 is full. If this buffer is not loaded then the processor blocks on the buffer loaded instance 242.

If the main event handler buffer is loaded, the processor is directed to a lookup table instance 244 which directs the processor to find an event code record in the event code lookup table 208 shown in FIG. 5, having parameter type field 211 contents corresponding to the contents of the parameter type field in the main event handler buffer 204 shown in FIG. 6.

On finding such an event code record, the system microprocessor 90 is directed to a copy event code instance 246 which directs the processor to copy the contents of the event code field 213 from the event code record into the event queue buffer 206 shown in FIG. 6 and also to copy the contents of the data field 209 of the main event handler buffer 204 shown in FIG. 6 to the event queue buffer 206 in association with the event code. Thus, the processor stores, in the event queue buffer 206, a first event record including an event code from the event code lookup table 208 and data from the data field 250 of the main event handler buffer 204 shown in FIG. 6.

FIG. 10

Figure 10:
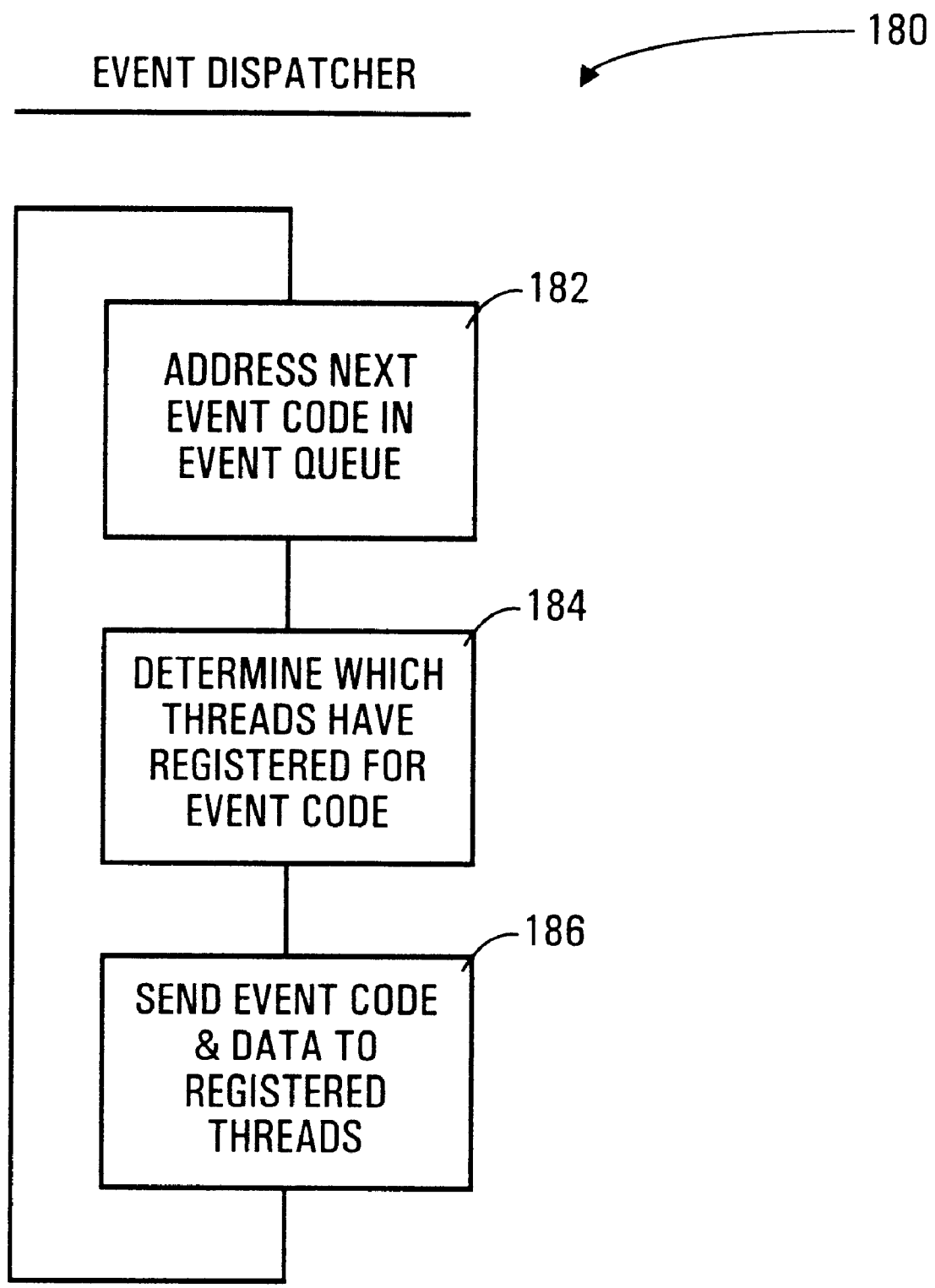
FIG. 10 is a flowchart of an event dispatcher run by the system processor.

Referring to FIG. 10, the event dispatcher files in the main event handler subdirectory 183 shown in FIG. 5 establish an event dispatcher thread as shown generally at 180. The event dispatcher thread includes a first instance which directs the system processor to address the next event code record in the event queue buffer 206 shown in FIG. 6. The system processor is then directed to instance 184 which directs it to determine which threads have registered for the event code record addressed at instance 182. The registration of threads with event code records is assumed to have been previously accomplished according to conventional practices. After having determined which threads have registered for the current event code record, instance 186 directs the processor to communicate the current event code record from the event queue buffer 206 to the registered threads. In this manner, data is passed from the event queue buffer 206 to appropriate threads.

FIG. 11

Figure 11:
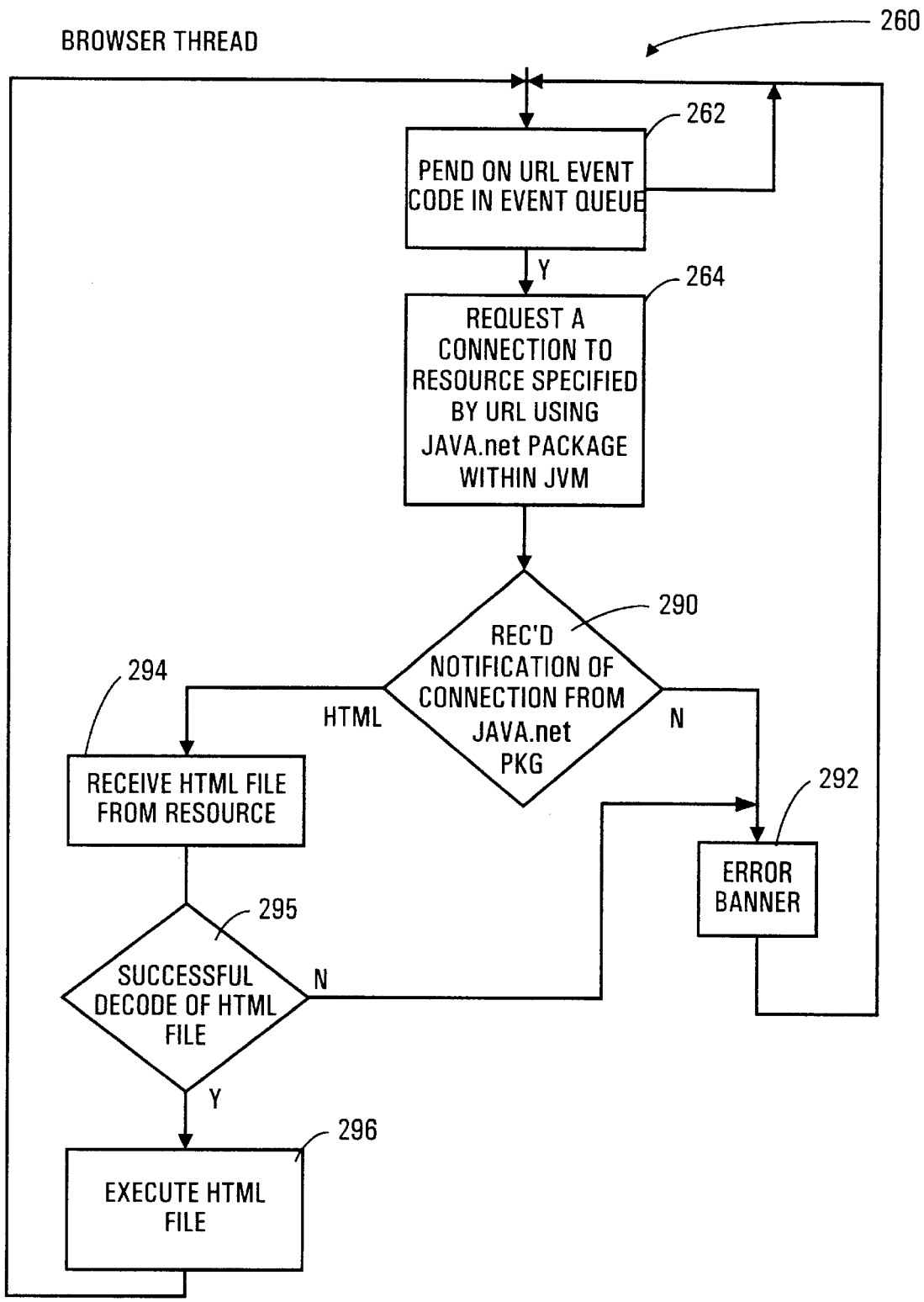
FIG. 11 is a flowchart of the browser thread run by the system processor.

Referring to FIG. 11, a browser thread 260 is implemented by the browser files in the browser subdirectory 185 shown in FIG. 5. The browser thread includes a pend instance 262 which directs the processor to pend for receipt of a URL event code record from the event dispatcher thread 180 shown in FIG. 10.

On receipt of a URL event code record, a request instance 264 directs the system microprocessor 90 to request a connection to a world-wide web resource specified by the URL in the data field 250 of the event record. Such connection is requested using classes in the Java net package of the Java virtual machine.

FIG. 12

Figure 12:
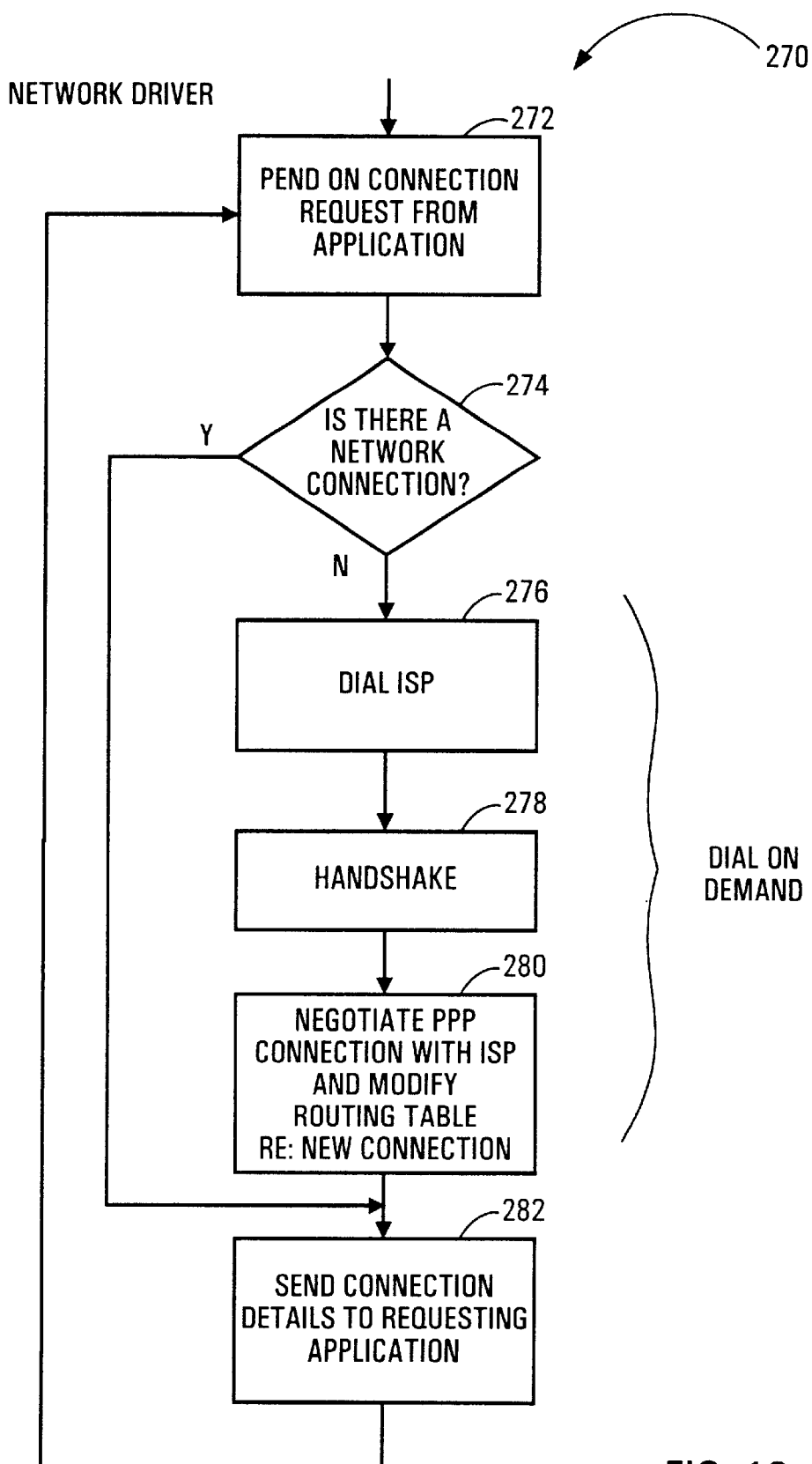
FIG. 12 is a flowchart of a network driver run by the system processor.

Referring to FIG. 12, if a connection is requested by an application, the network driver 270 included within the operating system file 165 shown in FIG. 5 is run. The network driver task includes a first instance 272 which directs the system microprocessor 90 to pend awaiting a connection request from the browser thread shown in FIG. 11.

On receiving a connection request, instance 274 directs the system microprocessor 90 to check the routing table 155 shown in FIG. 6 to determine whether or not a network connection has already. been established. Referring to FIG. 12, if no such connection has been established, instance 276 directs the system microprocessor 90 to command the modem 130 to connect to the third telephone line 58 to place a telephone call on the third telephone line 28 via public switched telephone network to the Internet services provider 24 shown in FIG. 1.

Referring back to FIG. 12, establishment of a connection with the Internet services provider involves a handshaking instance 278.

On establishing connection with the Internet services provider, instance 280 directs the processor to negotiate a point to point protocol (PPP) connection with the Internet services provider and to store the details of the PPP connection in the routing table 155. A network connection is thus created.

Instance 282 then directs the system microprocessor 90 to notify the requesting application of the connection to the resource specified by the URL in the data field 250 of the event record.

On completion of transmission of the details to the browser thread, the system microprocessor 90 is directed back to instance 272 where it pends on receipt of a further connection request from the browser thread.

It should be noted that at instance 274, where the processor is directed to determine whether or not a connection has already been established, if such a connection has already been established, the processor is directed directly to instance 282 where it notifies the requesting application of such connection.

Referring back to FIG. 11, notification of the connection established by the network driver task shown in FIG. 12 is received at instance 290 in FIG. 11.

Still referring to FIG. 11, if no connection has been made and no connection can be established, instance 292 directs the system microprocessor 90 to display an error banner to indicate that the connection could not be established. The processor is then returned back to the pend instance 262.

If at instance 290, notification of a connection has been received, instance 294 directs the processor to receive and decode an HTML file from the resource indicated by the URL passed to the browser by the event dispatcher. In this embodiment, the HTML page is downloaded from the first content provider 26. The HTML file is received and stored in the temporary directory 173 in the FLASH 156.

Instance 295 then directs the processor to determine whether or not the HTML file has been successfully decoded, according to well known browser decoding criteria. In this embodiment, the browser includes a security manager which imposes restrictions on what hosts any applets within the HTML file can communicate with. In particular in this embodiment, applets are restricted from reading or writing to the flash memory shown in FIG. 5. Applets may only open socket connections to the host that served them. They are not permitted to open server sockets themselves, they are not permitted to start other processes on the local host and they are not permitted to have native methods.

If the HTML file was not successfully decoded, the processor is directed to the error banner instance 292. If the HTML file was successfully decoded, instance 296 directs the processor to execute the HTML file to display the content contained therein and to spawn threads on each applet, if any, contained therein. After spawning such threads, the processor is returned back to the pend instance 262.

Operation

Referring to FIG. 1, the content provider 26 includes a web server 350 and a database of HTML files 352. The database 36 at the personal computer of the first CPE has a list of URLs which identify the individual HTML pages 352 at the first content provider 26. Thus, the personal computer at the first CPE acts as means for maintaining a list of network resource locators at the first customer premises equipment and selectively using the network resource locators in respective FSK messages.

It is contemplated that a user of the second telephone 20 makes a telephone call on the second telephone line 18 to the first telephone 32. Thus the second telephone acts as means disposed at the second customer premises equipment for establishing a telephone call on a first telephone line, between the first and second customer premises equipment. When a call has been established, during the call, the user of the second telephone may request to a user of the first telephone, by voice, to see a picture of services provided by the user of the first telephone. In this case, the user of the first telephone enters on the keyboard 42 an indication of the desired page to be shown and the microprocessor 34 retrieves a corresponding associated URL from the memory 36. The microprocessor then produces a series of bytes representing a desired FSK message to be sent to the second telephone and presents such bytes along with appropriate command codes to the FSK transmitter, while at the same time setting a mute signal active to activate the mute circuit 40 to prevent FSK signals produced by the FSK transmitter from being transmitted to the telephone 32. The FSK signals are, however, transmitted on the first telephone line 16 to the central office 22 which further transmits these signals to the second telephone via the second telephone line 18. Thus, the microprocessor and FSK transmitter act as a processor transmitter or means for generating at the first customer premises equipment a frequency shift keyed message containing a network resource locator. The mute circuit 40 and processor act as means for transmitting the FSK message from the first customer premises equipment to the second customer premises equipment during the telephone call.

The second telephone line 18 receives the FSK signals through the FSK receiver 150 and deposits a replica of the FSK message in the FSK receive buffer 200. The FSK receiver thus acts as a receiver or means for receiving the FSK message at the second customer premises equipment.

The telephone further receives the FSK message 70 through the event parser thread 220 shown in FIG. 8 and the main event handler thread 240 shown in FIG. 9 which load the event queue buffer 206 with a URL event code and the contents of the parameter data field 82 which contains the URL of the HTML file 356 at the first content provider 26 shown in FIG. 1. Thus, the processor acts as means for extracting the network resource locator from the FSK message.

Referring to FIGS. 1 and 11, the browser thread 260 directs the system microprocessor 90 to control the modem 130 to establish a connection with the Internet services provider 24 and the network driver 270 shown in FIG. 12 establishes a network connection between the telephone 20 and the first content provider 26 through the third telephone line 28, the Internet services provider 24 and the world-wide web 23. Thus, the system processor and browser thread act as means for establishing a connection to a network resource indicated by the network resource locator and more particularly, means for establishing the connection to the network resource on a second telephone line while maintaining the telephone call active on the first telephone line.

The first content provider 26 transmits the HTML file containing the applet back to the telephone 20 and such HTML file is received in the temporary directory 173 shown in FIG. 5. Thus, the processor and browser act as means for downloading a file from the network resource identified by the network resource locator. The browser thread 260 then executes the HTML file and displays any content on the display 102 and spawns applet threads on each applet included therein.

In this embodiment, the entire content of the HTML file from the content provider is displayed on the display 102. Thus, marketing or advertising content is automatically displayed on the display. The browser has no navigation tools or buttons and, therefore, the advertisement is displayed unobstructed.

The HTML file may include a plurality of links which the user can select using an input device (not shown) and such links may be used by the browser to connect to another resource on the world-wide web or to connect to a resource within the telephone itself. Such resource would be stored in a sub-directory of the system subdirectory 167 shown in FIG. 5.

Applets may be used to create animated marketing advertisements or presentations which may be more appealing to a user. In addition, high resolution pictures may be included within the HTML file as GIF files or the like.

As HTML pages are for use on display screens of a predefined aspect ratio, advertising for use on telephones of the type described, can be simply and easily developed using conventional HTML page development techniques. This facilitates convenient creation of advertising content for the telephone.

It will be appreciated that the microprocessor at the first customer premises equipment directs the mute circuit 40 to perform the mute function only where the FSK message is being transmitted by the FSK transmitter. Otherwise, the mute circuit 40 is not active and users of the first and second telephones may continue to converse, while the second telephone navigates to the network resource specified by the URL in the FSK message transmitted by the second telephone. Thus, the browser and processor at the second telephone and the personal computer at the first customer premises equipment act as means for producing a display image at the second customer premises equipment, from the file, while displaying an associated image at the first customer premises equipment. More particularly, the apparatus includes means for producing a display image at the second customer premises equipment while displaying an associated image at the first customer premises equipment, while maintaining the telephone call on the first telephone line to enable a user of the second customer premises equipment to view images designated by a user of the first customer premises equipment, while conducting a telephone conversation with the user of the first customer premises equipment.

While the second telephone navigates to the network resource specified by the URL in the FSK message and while the voice call is being conducted, the first computer produces display images at the first customer premises equipment, the display images corresponding to respective network resource locators included in respectively transmitted FSK messages.

While specific embodiments of the invention have been described and illustrated, such embodiments should be considered illustrative of the invention only and not as limiting the invention as construed in accordance with the accompanying claims.

What is claimed is:

1. A method of conducting a multimedia telephone call, the method comprising:
    a) establishing a telephone call between first and second customer premises equipment;
    b) generating, at said first customer premises equipment, a frequency shift keyed (FSK) message containing a network resource locator;
    c) transmitting said FSK message from said first customer premises equipment to said second customer premises equipment during said telephone call;
    d) receiving said FSK message at said second customer premises equipment;
    e) maintaining a list of network resource locators at said first customer premises equipment and selectively using said network resource locators in respective FSK messages; and
    f) associating image files with respective said network resource locators and producing display images corresponding to respective network resource locators when an FSK message is generated.

2. A method as claimed in claim 1 further including extracting said network resource locator from said FSK message.

3. A method as claimed in claim 2 further including establishing a connection to a network resource indicated by said network resource locator.

4. A method as claimed in claim 3 further including establishing said connection to said network resource using a second telephone line.

5. A method as claimed in claim 4 further including establishing said connection to said network resource while maintaining said telephone call active.

6. A method as claimed in claim 5 further including downloading a file from said network resource indicated by said network resource locator.

7. A method as claimed in claim 6 further including producing a display image from said file at said second customer premises equipment, while displaying an associated image at said first customer premises equipment.

8. A method as claimed in claim 7 wherein producing includes producing said display image at said second customer premises equipment while displaying said associated image at said first customer premises equipment, while maintaining said telephone call to enable a user of said second customer premises equipment to view images designated by a user of said first customer premises equipment, while conducting a telephone conversation with said user of said first customer premises equipment.

9. A method of dynamically dispatching network resource locators, the method comprising:
    a) generating at a first customer premises equipment a frequency shift keyed (FSK) message representing a network resource locator;
    b) transmitting said FSK message from said first customer premises equipment to a second customer premises equipment during a telephone call between said first customer premises equipment and the second customer premises equipment;
    c) maintaining a list of network resource locators at said first customer premises equipment and selectively using said network resource locators in respective FSK messages; and
    d) associating image files with respective said network resource locators and producing display images corresponding to respective network resource locators when an FSK message is generated.

10. An apparatus for dynamically dispatching network resource locators from a first customer premises equipment to a second customer premises equipment, the apparatus comprising:
    a) means for generating at the first customer premises equipment a frequency shift keyed (FSK) message representing a network resource locator;
    b) means for transmitting said FSK message from the first customer premises equipment to the second customer premises equipment during a telephone call between the first customer premises equipment and the second customer premises equipment;
    c) means for maintaining a list of network resource locators at said first customer premises equipment and selectively using said network resource locators in respective FSK messages; and
    d) means for associating image files with respective said network resource locators and for producing display images at said first customer premises equipment, said display images corresponding to respective network resource locators when an FSK message is generated.

11. A system for conducting a multimedia telephone call, the system comprising:
    a) first and second customer premises equipment and means disposed at least one of said first and second customer premises equipment for establishing a telephone call on a first telephone line, between said first and second customer premises equipment;
b) means for generating, at said first customer premises equipment, a frequency shift keyed (FSK) message containing a network resource locator;
c) means for transmitting said FSK message from said first customer premises equipment to said second customer premises equipment during said telephone call;
d) means for receiving said FSK message at said second customer premises equipment;
e) means for maintaining a list of network resource locators at said first customer premises equipment and means for selectively using said network resource locators in respective FSK messages; and
f) means for associating image files with respective said network resource locators and means for producing display images at said first customer premises equipment, said display images corresponding to respective network resource locators when an FSK message is generated.

12. A system as claimed in claim 11 further including means for extracting said network resource locator from said FSK message.

13. A system as claimed in claim 12 further including means for establishing a connection to a network resource indicated by said network resource locator.

14. A system as claimed in claim 13 further including means for establishing said connection to said network resource on a second telephone line.

15. A system as claimed in claim 14 further including means for establishing said connection to said network resource while maintaining said telephone call active on said first telephone line.

16. A system as claimed in claim 15 further including means for downloading a file from said network resource indicated by said network resource locator.

17. A system as claimed in claim 16 further including means for producing a display image from said file at said second customer premises equipment, while displaying an associated image at said first customer premises equipment.

18. A system as claimed in claim 17 wherein said means for producing includes means for producing said display image at said second customer premises equipment while displaying said associated image at said first customer premises equipment, while maintaining said telephone call on said first telephone line to enable a user of said second customer premises equipment to view images designated by a user of said first customer premises equipment, while conducting a telephone conversation with said user of said first customer premises equipment.

19. An apparatus for dynamically dispatching network resource locators from a first customer premises equipment to a second customer premises equipment, the apparatus comprising:
a) a processor at the first customer premises equipment, for generating a frequency shift keyed (FSK) message containing a network resource locator;
b) a transmitter for transmitting said FSK message from the first customer premises equipment to the second customer premises equipment during a telephone call between the first customer premises equipment and the second customer premises equipment;
c) a memory at said first customer premises equipment configured and arranged to maintain a list of network resource locators at said first customer premises equipment, and wherein said processor is programmed to selectively include said network resource locators in respective FSK messages, said processor being programmed to associate image files with respective said network resource locators and produce display images at said first customer premises equipment, said display images corresponding to respective network resource locators included in said FSK messages, as said FSK messages are generated.

20. A system for conducting a multimedia telephone call, the system comprising:
a) first and second customer premises equipment operable to establish a telephone call between each other on a first telephone line;
b) a first processor at said first customer premises equipment, for generating at said first customer premises equipment, a frequency shift keyed (FSK) message containing a network resource locator;
c) a transmitter for transmitting said FSK message from said first customer premises equipment to said second customer premises equipment during said telephone call;
d) a receiver at said second customer premises equipment for receiving said FSK message;
e) a memory at said first customer premises equipment configured and arranged to maintain a list of network resource locators at said first customer premises equipment, said first processor being programmed to selectively include said network resource locators in respective FSK messages, said first processor being programmed to associate image files with respective said network resource locators and produce display images at said first customer premises equipment, said display images corresponding to respective network resource locators Included in said FSK messages, as said FSK messages are generated.

21. A system as claimed in claim 20 further including a second processor at said second customer premises equipment for extracting said network resource locator from said FSK message.

22. A system as claimed in claim 21 further including a browser running on said second processor at said second customer premises equipment for establishing a connection to a network resource indicated by said network resource locator.

23. A system as claimed in claim 22 further including a modem for establishing said connection to said network resource on a second telephone line.

24. A system as claimed in claim 23 wherein said second processor at said second customer premises equipment is operable to establish said connection to said network resource while maintaining said telephone call active on said first telephone line.

25. A system as claimed in claim 24 wherein said second processor and said browser at said second customer premises equipment are operable to download a file from said network resource indicated by said network resource locator.

26. A system as claimed in claim 25 further including first and second displays at said first and second customer premises equipment respectively and wherein said second processor at said second customer premises equipment is operable to cooperate with said second display to produce a display image from said file at said second customer premises equipment, while said first processor at said first customer premises equipment is operable to cooperate with said first display to display an associated image at said first customer premises equipment.

27. A system as claimed in claim 26 wherein said second processor is operable to cooperate with said second display to produce said display image while said first processor is operable to cooperate with said first display to display said associated image, while maintaining said telephone call on said first telephone line to enable a user of said second customer premises equipment to view images designated by a user of said first customer premises equipment, while conducting a telephone conversation with said user of said first customer premises equipment.

* * * * *